(12) United States Patent
Majumdar et al.

(10) Patent No.: US 10,452,437 B2
(45) Date of Patent: Oct. 22, 2019

(54) TEMPERATURE-AWARE TASK SCHEDULING AND PROACTIVE POWER MANAGEMENT

(71) Applicant: Advanced Micro Devices, Inc., Sunnyvale, CA (US)

(72) Inventors: Abhinandan Majumdar, Ithaca, NY (US); Brian J. Kocoloski, Pittsburgh, PA (US); Leonardo Piga, Austin, TX (US); Wei Huang, Frisco, TX (US); Yasuko Eckert, Redmond, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 188 days.

(21) Appl. No.: 15/192,784

(22) Filed: Jun. 24, 2016

(65) Prior Publication Data

US 2017/0371719 A1    Dec. 28, 2017

(51) Int. Cl.
| | |
|---|---|
| *G06F 9/48* | (2006.01) |
| *G06F 9/50* | (2006.01) |
| *G06F 1/20* | (2006.01) |
| *G06F 1/329* | (2019.01) |

(52) U.S. Cl.
CPC ............ *G06F 9/4893* (2013.01); *G06F 1/206* (2013.01); *G06F 1/329* (2013.01); *G06F 9/5094* (2013.01); *Y02D 10/24* (2018.01)

(58) Field of Classification Search
CPC ...... G06F 9/5094; G06F 9/4893; G06F 1/206; G06F 1/329; Y02D 10/24
See application file for complete search history.

(56) References Cited

U.S. PATENT DOCUMENTS

| | | | |
|---|---|---|---|
| 7,455,450 B2 | 11/2008 | Liu et al. | |
| 9,122,648 B2 | 9/2015 | Askar et al. | |
| 9,317,082 B2 | 4/2016 | Bates et al. | |
| 9,347,836 B2 | 5/2016 | Temkine et al. | |

(Continued)

OTHER PUBLICATIONS

Choi, et al., "Thermal-aware Task Scheduling at the System Software Level", Proceedings of the 2007 International Symposium on Low Power Electronics and Design, Aug. 27, 2007, pp. 213-218, ACM, New York, NY, USA.

(Continued)

*Primary Examiner* — Jacob D Dascomb
(74) *Attorney, Agent, or Firm* — Meyertons Hood Kivlin Kowert and Goetzel PC; Rory D. Rankin

(57) ABSTRACT

Systems, apparatuses, and methods for performing temperature-aware task scheduling and proactive power management. A SoC includes a plurality of processing units and a task queue storing pending tasks. The SoC calculates a thermal metric for each pending task to predict an amount of heat the pending task will generate. The SoC also determines a thermal gradient for each processing unit to predict a rate at which the processing unit's temperature will change when executing a task. The SoC also monitors a thermal margin of how far each processing unit is from reaching its thermal limit. The SoC minimizes non-uniform heat generation on the SoC by scheduling pending tasks from the task queue to the processing units based on the thermal metrics for the pending tasks, the thermal gradients of each processing unit, and the thermal margin available on each processing unit.

20 Claims, 8 Drawing Sheets

(56) References Cited

U.S. PATENT DOCUMENTS

| | | | |
|---|---|---|---|
| 2005/0086029 A1* | 4/2005 | Cascaval | G06F 1/206 |
| | | | 702/196 |
| 2005/0216222 A1* | 9/2005 | Inoue | G06F 1/206 |
| | | | 702/136 |
| 2013/0144549 A1 | 6/2013 | Temkine et al. | |
| 2014/0059556 A1* | 2/2014 | Barsness | G06F 1/3203 |
| | | | 718/102 |
| 2015/0169363 A1* | 6/2015 | Anderson | G06F 9/4893 |
| | | | 718/103 |
| 2015/0346800 A1* | 12/2015 | Kumar | G06F 1/3206 |
| | | | 713/323 |
| 2017/0277564 A1* | 9/2017 | Coteus | G06F 9/5094 |

OTHER PUBLICATIONS

Coskun et al., "Temperature Aware Task Scheduling in MPSoCs", Proceedings of the Conference on Design, Automation and Test in Europe, Apr. 16, 2007, pp. 1659-1664, EDA Consortium, San Jose, CA, USA.

Duley et al., U.S. Appl. No. 09/751,865, entitled "Temperature Measurement System and Method", filed Dec. 29, 2000, 27 pages.

Yang et al., "Dynamic Thermal Management through Task Scheduling", IEEE International Symposium on Performance Analysis of Systems and Software, Apr. 20, 2008, pp. 191-201, IEEE Computer Society, Washington, D.C., USA.

* cited by examiner

TEMPERATURE-AWARE TASK SCHEDULING AND PROACTIVE POWER MANAGEMENT

The invention described herein was made with government support under contract number DE-AC52-07NA27344 awarded by the United States Department of Energy. The United States Government has certain rights in the invention.

BACKGROUND

Description of the Related Art

Managing power consumption in computing systems, integrated circuits (ICs), processors, and systems on chips (SoCs) is increasingly important. One of the objectives in operating an SoC is ensuring that the SoC's temperature does not exceed a thermal limit, above which the SoC cannot operate correctly or may even be damaged. Also, even when the thermal limit is not exceeded, high operating temperatures can induce high leakage current and may cause a decrease in the reliability and lifetime of the SoC while also increasing the cooling cost of the SoC. Additionally, non-uniform heat generation on an SoC may prevent the SoC from achieving its highest performance. Accordingly, intelligent thermal management schemes are important for maintaining efficient operation of a SoC.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
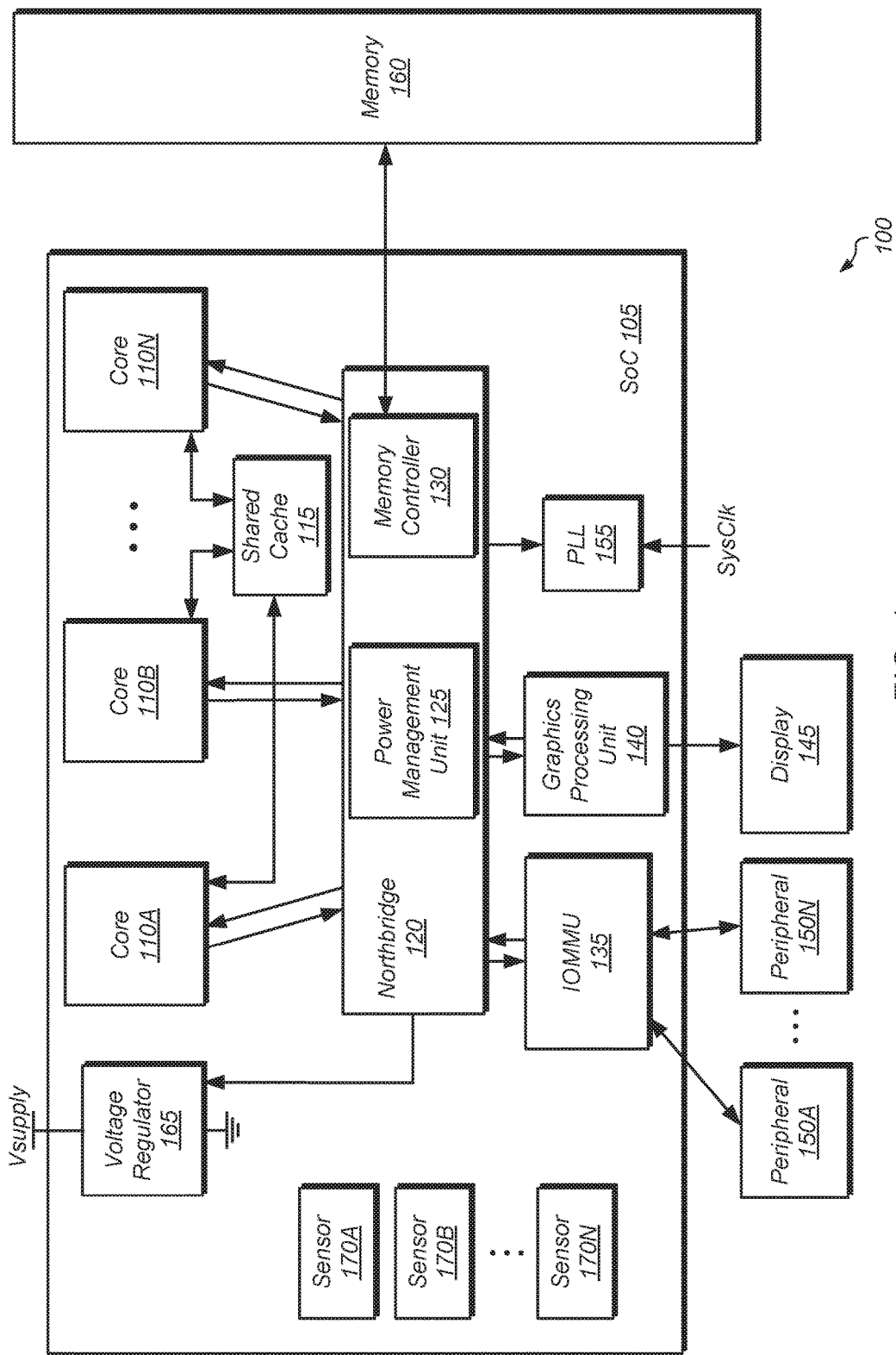
FIG. 1 is a block diagram of one embodiment of a computing system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Systems, apparatuses, and methods for performing temperature aware task scheduling and proactive power management are contemplated. In one embodiment, a system-on-chip (SoC) includes at least a plurality of processing units, one or more memory devices, and a task queue for storing pending tasks to be executed on the processing units. The SoC includes a scheduler and a power management unit to schedule tasks to the processing units in a manner that minimizes non-uniform heat generation on the SoC while simultaneously maximizing performance. Additionally, the power management unit proactively manages the power states (e.g., power performance states (P-states)) of the processing units and the scheduler schedules pending tasks to the processing units to prevent thermal limits from being exceeded by the SoC.

In one embodiment, the SoC is configured to calculate a thermal metric for each pending task in the task queue. The thermal metric for a pending task indicates an amount of heat the pending task is predicted to generate when executed. The SoC is also configured to determine a thermal gradient for each processing unit of the SoC. The thermal gradient for a processing unit indicates how much or a rate at which a processing unit temperature will change when executing a given task. The SoC is also configured to monitor a thermal margin available on each processing unit. The thermal margin for a processing unit indicates how much a temperature of the processing unit can increase without exceeding a thermal limit of the processing unit.

The SoC is configured to minimize non-uniform heat generation on the SoC by scheduling pending tasks from the task queue to the plurality of processing units based on the thermal metrics of the pending tasks, the thermal gradients of each processing unit, and the thermal margin available on each processing unit. The SoC is also configured to assign pending tasks from the task queue out of order to maximize performance while staying under the thermal limits for the plurality of processing units and while preventing non-uniform heat generation on the SoC. In one embodiment, the SoC is configured to multiply a thermal metric of each pending task by a thermal gradient of the different processing units. The SoC compares the products of the thermal metrics and thermal gradients of the various pending tasks and processing units to the thermal margins of the processing units. The SoC allows a given pending task to be scheduled on a given processing unit if the product of the thermal metric of the given pending task and the thermal gradient of the given processing unit is less than or equal to the thermal margin of the given processing unit. Otherwise, the SoC prevents a given pending task from being scheduled on a given processing unit if the product of the thermal metric of the given pending task and the thermal gradient of the given processing unit is greater than the thermal margin available on the given processing unit.

Referring now to FIG. 1, a block diagram of a computing system 100 in accordance with some embodiments is shown. In these embodiments, computing system 100 includes system on chip (SoC) 105 coupled to memory 160. SoC 105 is also referred to as an integrated circuit (IC). In some embodiments, SoC 105 includes a plurality of processor cores 110A-N. In other embodiments, SoC 105 includes a single processor core 110. In multi-core embodiments, processor cores 110 are identical to each other (i.e., symmetrical multi-core), or one or more cores are different from others (i.e., asymmetric multi-core). Each processor core 110 includes one or more execution units, cache memories, schedulers, branch prediction circuits, and so forth. Furthermore, each of processor cores 110 is configured to assert requests for access to memory 160, which functions as main memory for computing system 100. Such requests include read requests and/or write requests, and are initially received from a respective processor core 110 by northbridge 120.

Input/output memory management unit (IOMMU) 135 is also coupled to northbridge 120 in the embodiment shown. IOMMU 135 functions as a south bridge device in computing system 100. A number of different types of peripheral buses (e.g., peripheral component interconnect (PCI) bus, PCI-Extended (PCI-X), PCIE (PCI Express) bus, gigabit Ethernet (GBE) bus, universal serial bus (USB)) are coupled to IOMMU 135. Various types of peripheral devices 150A-N are coupled to some or all of the peripheral buses. Such peripheral devices include (but are not limited to) keyboards, mice, printers, scanners, joysticks or other types of game controllers, media recording devices, external storage devices, network interface cards, and so forth. At least some of the peripheral devices 150A-N that are coupled to IOMMU 135 via a corresponding peripheral bus assert memory access requests using direct memory access (DMA). These requests (which include read and write requests) are conveyed to northbridge 120 via IOMMU 135.

In some embodiments, SoC 105 includes a graphics processing unit (GPU) 140 that is coupled to display 145 of computing system 100. In some embodiments, GPU 140 is an integrated circuit that is separate and distinct from SoC 105. Display 145 is a flat-panel LCD (liquid crystal display), plasma display, a light-emitting diode (LED) display, or any other suitable display type. GPU 140 performs various video processing functions and provide the processed information to display 145 for output as visual information. GPU 140 is also configured to perform other types of tasks scheduled to GPU 140 by an application scheduler.

SoC 105 includes any number of cores 110A-N and compute units of GPU 140 for executing tasks of various applications or processes. The cores 110A-N and GPU 140 may also be referred to more generally as "compute units" or "processing units". The application or task scheduler (not shown) of SoC 105 are configured to schedule tasks to cores 110A-N and compute units of GPU 140 so as to minimize, or otherwise reduce, non-uniform heat generation on SoC 105 based on the thermal metrics of the pending tasks, the thermal gradients of each processing unit, and the thermal margin available on each processing unit. Additional descriptions of task schedulers are included throughout this disclosure.

In one embodiment, memory controller 130 is integrated into northbridge 120. In other embodiments, memory controller 130 is separate from northbridge 120. Memory controller 130 receives memory requests conveyed from northbridge 120. Data accessed from memory 160 responsive to a read request is conveyed by memory controller 130 to the requesting agent via northbridge 120. Responsive to a write request, memory controller 130 receives both the request and the data to be written from the requesting agent via northbridge 120. If multiple memory access requests are pending at a given time, memory controller 130 arbitrates between these requests.

In one embodiment, power management unit 125 is integrated into northbridge 120. In other embodiments, power management unit 125 is separate from northbridge 120 and/or power management unit 125 is implemented as multiple, separate components in multiple locations of SoC 105. Power management unit 125 is configured to manage the power states of the various processing units of SoC 105. In one embodiment, power management unit 125 uses dynamic voltage and frequency scaling (DVFS) to change the frequency and/or voltage of a processing unit to limit the processing unit's power consumption to a chosen power allocation.

SoC 105 includes multiple temperature sensors 170A-N, which are representative of any number of temperature sensors. It should be understood that while sensors 170A-N are shown on the left-side of the block diagram of SoC 105, sensors 170A-N are spread throughout the SoC 105 and/or are located next to the major components of SoC 105 in the actual implementation of SoC 105. In one embodiment, there is a sensor 170A-N for each core 110A-N, compute unit of GPU 140, and other major components. In this embodiment, each sensor 170A-N tracks the temperature of a corresponding component. In another embodiment, there is a sensor 170A-N for the different geographical regions of SoC 105. In this embodiment, sensors 170A-N are spread throughout SoC 105 and located so as to track the temperature in different areas of SoC 105 to monitor whether there are any hot spots in SoC 105. In other embodiments, other schemes for positioning the sensors 170A-N within SoC 105 are possible and are contemplated.

In some embodiments, memory 160 includes a plurality of memory modules. Each of the memory modules includes one or more memory devices (e.g., memory chips) mounted thereon. In some embodiments, memory 160 includes one or more memory devices mounted on a motherboard or other carrier upon which SoC 105 is also mounted. In some embodiments, at least a portion of memory 160 is implemented on the die of SoC 105 itself. Embodiments having a combination of the aforementioned embodiments are also possible and contemplated. Memory 160 is used to implement a random access memory (RAM) for use with SoC 105 during operation. The RAM implemented is static RAM (SRAM) or dynamic RAM (DRAM). The type of DRAM that is used to implement memory 160 includes (but are not limited to) double data rate (DDR) DRAM, DDR2 DRAM, DDR3 DRAM, and so forth.

Although not explicitly shown in FIG. 1, SoC 105 also includes one or more cache memories that are internal to the processor cores 110. For example, each of the processor cores 110 includes an L1 data cache and an L1 instruction cache. In some embodiments, SoC 105 includes a shared cache 115 that is shared by the processor cores 110. In some embodiments, shared cache 115 is an L2 cache. In some embodiments, each of processor cores 110 has an L2 cache implemented therein, and thus shared cache 115 is an L3 cache. Cache 115 is part of a cache subsystem including a cache controller.

In the embodiment shown, SoC 105 includes a phase-locked loop (PLL) unit 155 coupled to receive a system clock signal. PLL unit 155 includes a number of PLLs configured to generate and distribute corresponding clock signals to each of processor cores 110 and to other components of SoC 105. In this embodiment, the clock signals received by each of processor cores 110 are independent of one another. Furthermore, PLL unit 155 in this embodiment is configured to individually control and alter the frequency of each of the clock signals provided to respective ones of processor cores 110 independently of one another. The frequency of the clock signal received by any given one of processor cores 110 is increased or decreased in accordance with power states assigned by power management unit 125. The various frequencies at which clock signals are output from PLL unit 155 correspond to different operating points for each of processor cores 110. Accordingly, a change of operating point for a particular one of processor cores 110 is put into effect by changing the frequency of its respectively received clock signal.

In the case where changing the respective operating points of one or more processor cores 110 includes the changing of one or more respective clock frequencies, power management unit 125 changes the state of digital signals provided to PLL unit 155. Responsive to the change in these signals, PLL unit 155 changes the clock frequency of the affected processing node(s). Additionally, power management unit 125 also causes PLL unit 155 to inhibit a respective clock signal from being provided to a corresponding one of processor cores 110.

In the embodiment shown, SoC 105 also includes voltage regulator 165. In other embodiments, voltage regulator 165 is implemented separately from SoC 105. Voltage regulator 165 provides a supply voltage to each of processor cores 110 and to other components of SoC 105. In some embodiments, voltage regulator 165 provides a supply voltage that is variable according to a particular operating point (e.g., increased for greater performance, decreased for greater power savings). In some embodiments, each of processor cores 110 shares a voltage plane. Thus, each processing core 110 in such an embodiment operates at the same voltage as the other ones of processor cores 110. In another embodiment, voltage planes are not shared, and thus the supply voltage received by each processing core 110 is set and adjusted independently of the respective supply voltages received by other ones of processor cores 110. Thus, operating point adjustments that include adjustments of a supply voltage are selectively applied to each processing core 110 independently of the others in embodiments having non-shared voltage planes. In the case where changing the operating point includes changing an operating voltage for one or more processor cores 110, power management unit 125 changes the state of digital signals provided to voltage regulator 165. Responsive to the change in the signals, voltage regulator 165 adjusts the supply voltage provided to the affected ones of processor cores 110. In instances in power is to be removed from (i.e., gated) one of processor cores 110, power management unit 125 sets the state of corresponding ones of the signals to cause voltage regulator 165 to provide no power to the affected processing core 110.

In various embodiments, computing system 100 is a computer, laptop, mobile device, server, web server, cloud computing server, storage system, or other types of computing systems or devices. It is noted that the number of components of computing system 100 can vary from embodiment to embodiment. There can be more or fewer of each component/subcomponent than the number shown in FIG. 1. It is also noted that computing system 100 can include many other components not shown in FIG. 1.

Figure 2:
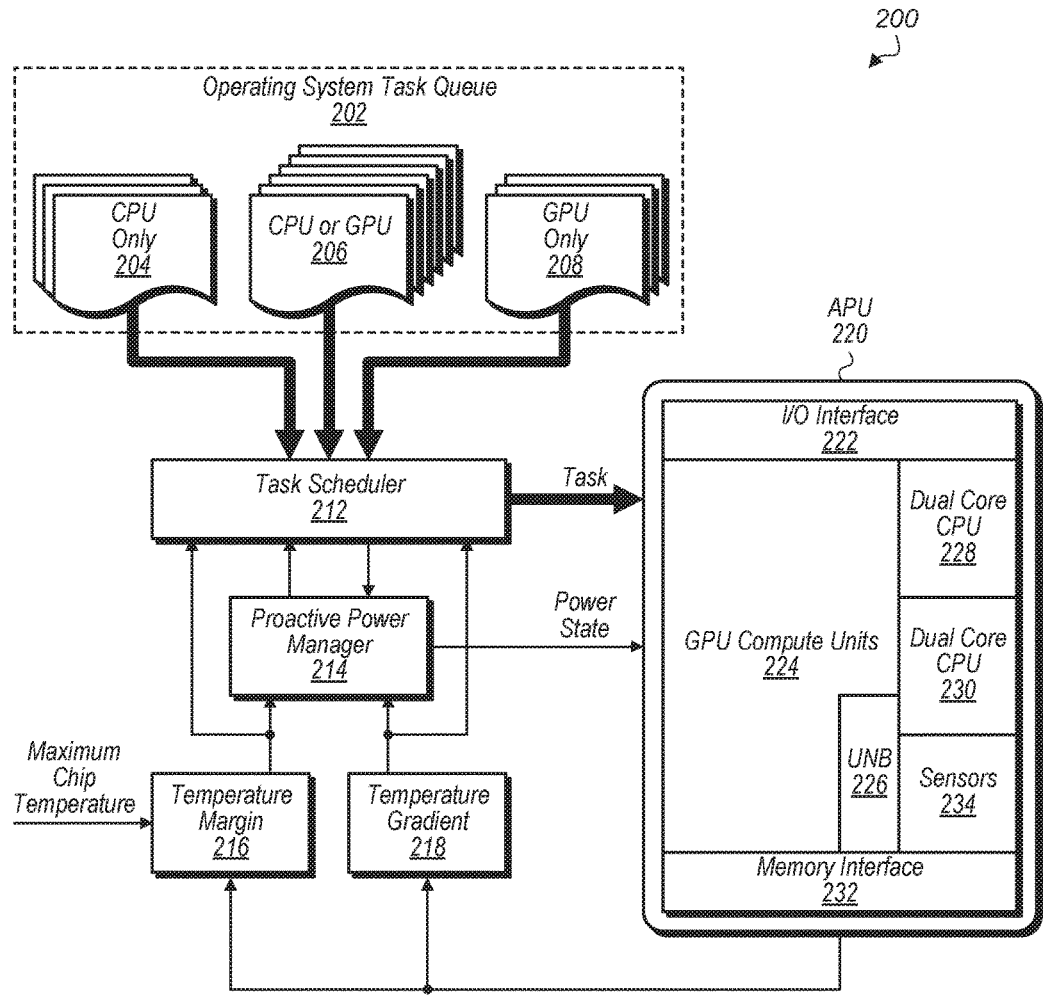
FIG. 2 is a block diagram of one embodiment of a SoC.

Turning now to FIG. 2, a block diagram of one embodiment of a SoC 200. SoC 200 includes operating system task queue 202, task scheduler 212, proactive power manager 214, and accelerated processing unit (APU) 220. APU 220 includes input/output (I/O) interface 222, GPU compute units 224, unified north bridge (UNB) 226, dual core central processing unit (CPU) 228, dual core CPU 230, memory interface 232, and sensors 234. In other embodiments, APU 220 includes other numbers of compute units, other numbers of CPUs, other components, and/or is organized in other suitable manners.

It is noted that sensors 234 are spread throughout APU 220 rather than located in one region of APU 220. For example, in one embodiment, each compute unit of GPU 224 and each core of CPU 228 and 230 includes a sensor to monitor the temperature of each individual compute unit. GPU compute units 224 include any number of compute units, depending on the embodiment. The compute units of GPU 224 may also be referred to as cores. Dual core CPU 228 and dual core CPU 230 each include two cores. In other embodiments, APU 220 includes other numbers of CPUs, and each CPU can have any number of cores.

Task scheduler 212 and proactive power manager 214 are implemented using any combination of software and/or hardware, depending on the embodiment. In one embodiment, task scheduler 212 and proactive power manager 214 are software components executing on dual-core CPUs 228 and 230 and/or GPU compute units 224. Task scheduler 212 works in combination with proactive power manager 214 to cooperatively perform task scheduling and power state decisions. Task scheduler 212 and proactive power manager 214 are configured to schedule tasks to the compute units and to control the power states of the compute units. Various pending tasks are stored in operating system task queue 202, and task scheduler 212 is configured to select tasks from task queue 202 for scheduling to the compute units.

Task scheduler 212 and proactive power manager 214 utilize various inputs for determining how to schedule tasks and manage power states. For example, task scheduler 212 and proactive power manager 214 utilize temperature margin 216 and temperature gradient 218 as inputs to aid in determining how to schedule tasks and manage power states. Temperature margin 216 may also be referred to as a "thermal margin" and temperature gradient 218 may also be referred to as a "thermal gradient" herein. Temperature margin 216 is the difference in the aggregate of measured temperatures from sensors on APU 220 from the maximum allowable chip temperature. For example, the maximum allowable chip temperature is 105 degrees Celsius in one embodiment. Temperature margin 216 is monitored during operation of SoC 200 by task scheduler 212 and proactive power manager 214 to determine the margin for increasing the temperature of SoC 200.

Temperature gradient 218 represents the change in the temperature of the compute units of APU 220 in response to the compute units performing their assigned tasks. Temperature gradient 218 includes a separate temperature gradient for each compute unit of APU 220. In one embodiment, the change in temperature is tracked over time and temperature gradients are calculated based on historical values. In another embodiment, the temperature gradients for compute units are calculated in advance based on knowledge of the compute units' architecture. In a further embodiment, the temperature gradients for compute units are based on both historical values and the compute units' architecture.

Queue 202 stores any number of tasks, and some tasks are targeted to CPUs only, GPUs only, or to either CPUs or GPUs. It is noted that the term "task" may also be used to refer to a "process" or "application" which is executed by one or more processing units of APU 220. In one embodiment, queue 202 includes tasks 204 which are CPU-only tasks, tasks 206 which are CPU or GPU tasks, and tasks 208 which are GPU-only tasks. The classification of the different tasks indicates the preferred compute unit for executing the task. Task scheduler 212 utilizes the type of a given task when determining which compute unit to schedule the given task. However, in some embodiments, task scheduler 212 schedules a CPU-only task 204 to a GPU and/or task scheduler 212 schedules a GPU-only task 208 to a CPU. For example, a GPU-only task 208 causes a lower increase in temperature (based on the temperature gradient 218 value of a CPU core) if executed on CPU 228 or 230 rather than being executed on a GPU compute unit 224. Accordingly, if the temperature margin 216 for GPU compute units 224 is less than a threshold, then task scheduler 212 schedules a GPU-only task 208 to a CPU 228 or 230.

Figure 3:
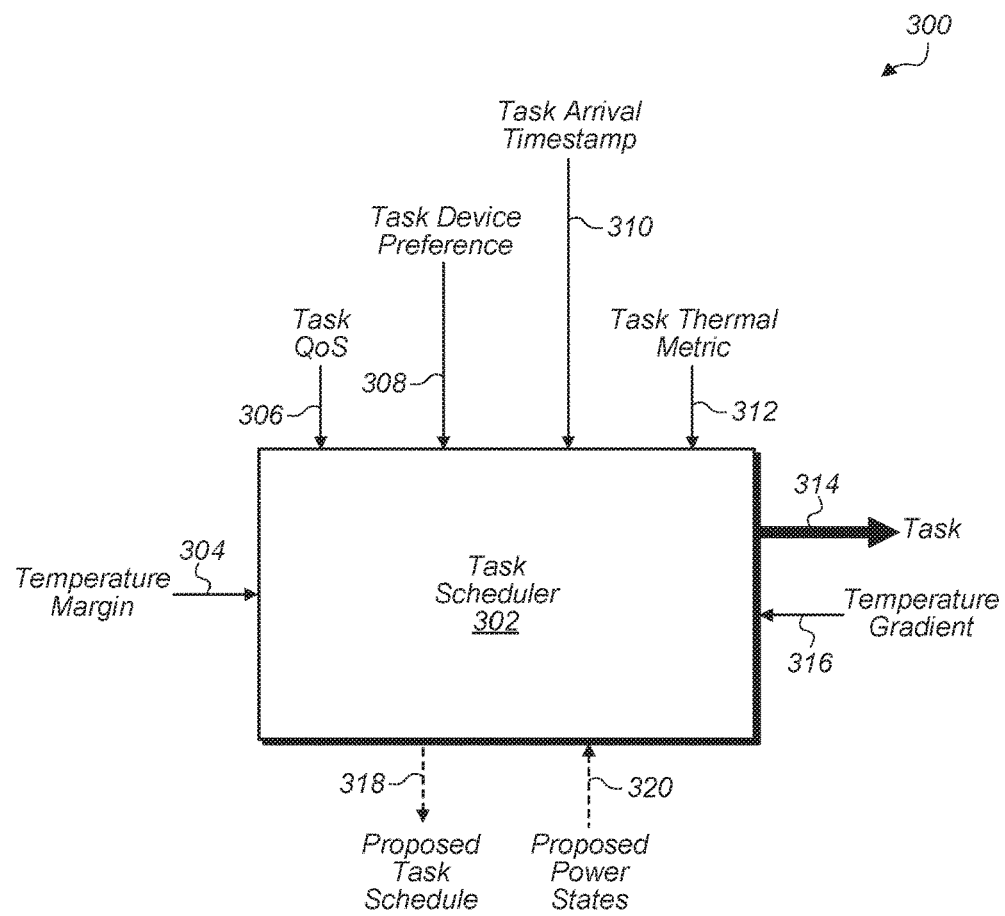
FIG. 3 illustrates one embodiment of task scheduler framework.

Referring now to FIG. 3, one embodiment of a task scheduler framework 300 is shown. In one embodiment, a task scheduler (e.g., task scheduler 212 of FIG. 2) assigns tasks from a task queue to a plurality of compute units of a SoC (e.g., SoC 200 of FIG. 2). The task scheduler 302 receives a plurality of inputs to use in determining how to schedule tasks to the various compute units of the SoC. The task scheduler 302 also coordinates with a proactive power manager (e.g., power manager 214 of FIG. 2) to determine an optimal task schedule for the pending tasks to the compute units of the SoC. The plurality of inputs utilized by the task scheduler 302 includes the thermal metrics 312 (i.e., degree of hotness/coldness) of the tasks in terms of the amount of heat estimated to be generated, quality of service (QoS) 306 requirement of the queued tasks, task arrival timestamp 310, and respective device preferences 308 (e.g., CPU, GPU). In various embodiments, the thermal metric 312 of a task is calculated based on historical data associated with previous executions of the task, one or more of hints passed from the programmers, whether the task is compute-bound or memory-bound, a compiler's statistical analysis based on types of instructions, frequency of datapath vs. memory instructions, memory address access patterns, and/or other factors. The task scheduler 302 also utilizes the temperature margin 304, temperature gradient 316 of the SoC's processing units, and the proposed power states 320 to determine an optimal task schedule 318 for the pending tasks 314. In other embodiments, the task scheduler utilizes other inputs to determine an optimal task schedule 318 for the pending tasks 314.

In various embodiments, the task scheduler 302 performs both spatial and temporal scheduling. Under spatial scheduling, tasks are assigned to specific compute units in the chip floorplan to maximize performance while staying within the thermal budget. The task scheduler also performs temporal scheduling, where the tasks of the task queue are assigned out of order. The task scheduler also prioritizes tasks that have been waiting for a long time to avoid starvation. The task scheduler coordinates with the proactive power manager to estimate the execution time for the pending tasks from the proposed compute unit power states.

In one embodiment, the task scheduler 302 attempts to minimize the sum of the execution time of the tasks on their assigned compute units and the wait time of the tasks such that the temperature increase of the compute units executing their assigned tasks stays below the temperature margin currently available. The task scheduler 302 also attempts to schedule tasks to keep the sum of the execution time of a given task plus the wait time of the given task less than or equal to the time indicated by the QoS setting of the given task. In other embodiments, other examples of algorithms for a task scheduler are possible and are contemplated.

Figure 4:
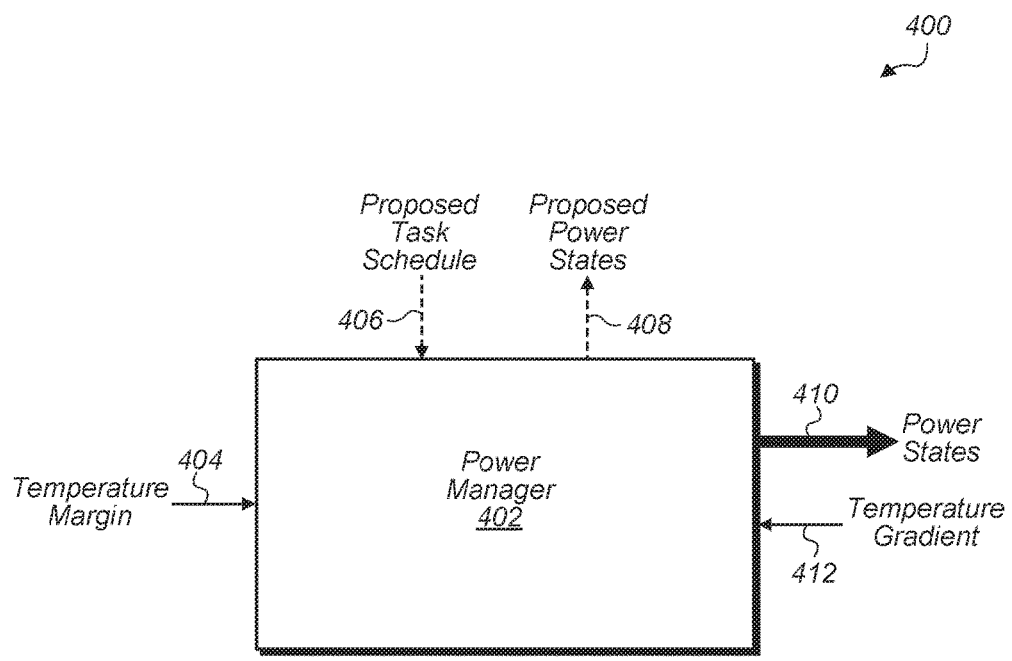
FIG. 4 illustrates one embodiment of a proactive power manager framework.

Turning now to FIG. 4, one embodiment of a proactive power manager framework 400 is shown. A power manager (e.g., power manager 214 of FIG. 2) receives various inputs to be utilized for making proactive changes to the power states of the compute units of the host SoC. For example, in one embodiment, the power manager 402 receives the temperature margins 404 and the temperature gradients 412 of the compute units of the SoC. The power manager 402 also receives the proposed task schedule 406 from the task scheduler. The power manager 402 generates and shares proposed power states 408 to the task scheduler.

The power manager 402 works in combination with the task scheduler to jointly determine the corresponding power states of the compute units for the proposed task schedule to avoid temperature violations. The power manager 402 and the task scheduler refine their proposed power states and proposed task schedule, respectively, until an optimal solution has been generated. Then, the power manager 402 generates control signals to configure the power states 410 of the compute units of the SoC once an optimal solution has been generated.

In one embodiment, the power manager 402 makes decisions on the appropriate power states for the compute units based on the application schedule generated by the task scheduler. As shown in box 402, the power manager 402 attempts to set the power states of the compute units such that the sum of the temperature gradients of the compute units executing their assigned tasks is less than or equal to the temperature margin available to the SoC. In one embodiment, the power manager 402 proactively selects a low power configuration for the compute units by scheduling the hotter tasks with higher thermal metrics first so that the remaining temperature margin 404 can be used for colder tasks. In various embodiments, the scheduling of tasks and assignment of power states are treated as a constraint satisfaction problem (CSP), and the power manager 402 runs any of various algorithms for solving the CSP to find a power-state allocation that meets the various constraints imposed on the scheduling of tasks and assignment of power states. In one embodiment, a model predictive control (MPC) algorithm is utilized for looking into a receding window of a subset of scheduled tasks along with the temperature gradient model of the compute units to determine appropriate power states for the scheduled tasks without violating temperature constraint. In other embodiments, other algorithms are utilized to determine power states for the power state allocation of the compute units of the SoC.

Figure 5:
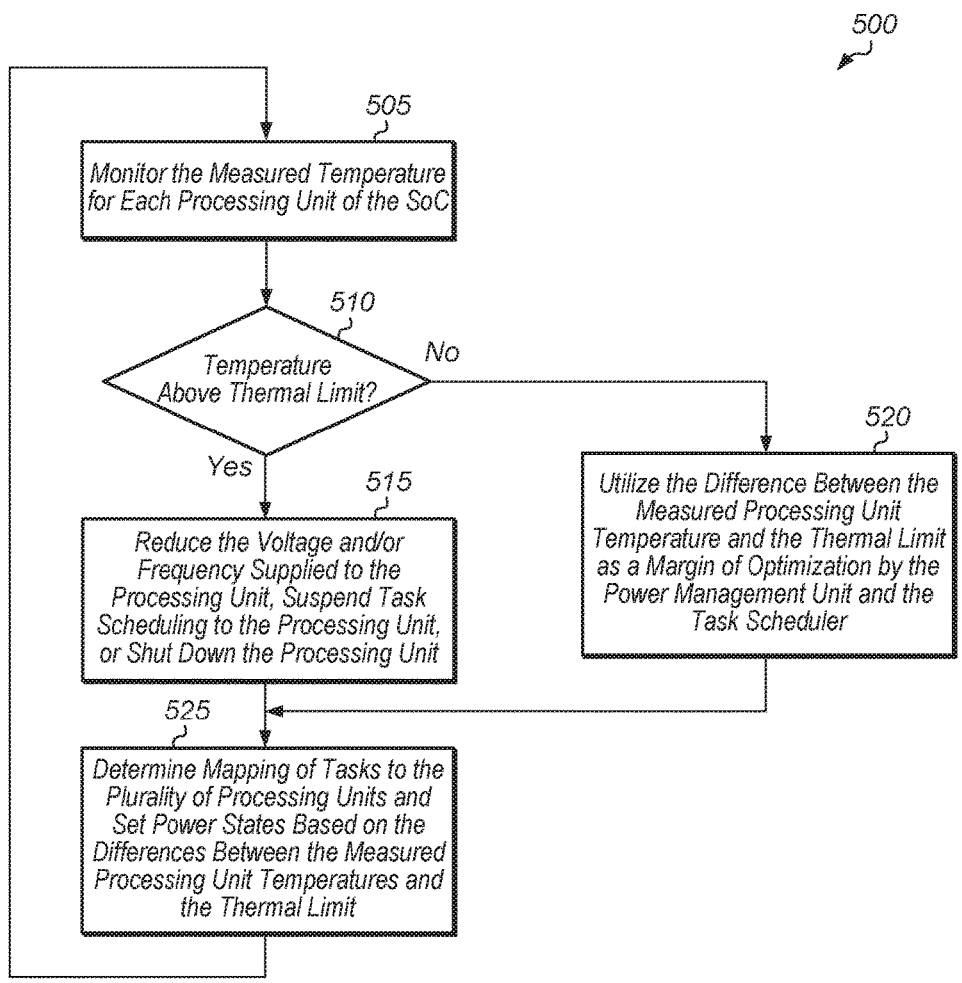
FIG. 5 is a generalized flow diagram illustrating one embodiment of a method for performing temperature-aware task scheduling and proactive power management.

Referring now to FIG. 5, one embodiment of a method 500 for performing temperature-aware task scheduling and proactive power management is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 500.

The power management unit of a SoC monitors the measured temperature for each processing unit of the SoC (block 505). In one embodiment, the SoC includes a plurality of processing units. In some embodiments, some of the processing units are different from the other processing units. For example, some processing units are CPUs, some are GPUs, and others are application specific integrated circuits (ASICs), field programmable gate arrays (FPGAs), or other types of processing units.

For a given processing unit, if the measured processing unit temperature is greater than or equal to the thermal limit (conditional block 510, "yes" leg), then the power management unit either reduces the voltage and frequency supplied to the given processing unit, suspends task scheduling to the given processing unit, or completely shuts down the given processing unit (block 515). If the measured processing unit temperature is less than the thermal limit (conditional block 510, "no" leg), then the difference between the measured processing unit temperature and the thermal limit is utilized as a margin of optimization by the power management unit and the task scheduler (block 520). The power management unit and task scheduler then determines how to map tasks to the plurality of processing units and set power states of the processing units based on the differences between the measured processing unit temperatures and thermal limit (block 525). After block 525, method 500 returns to block 505.

Figure 6:
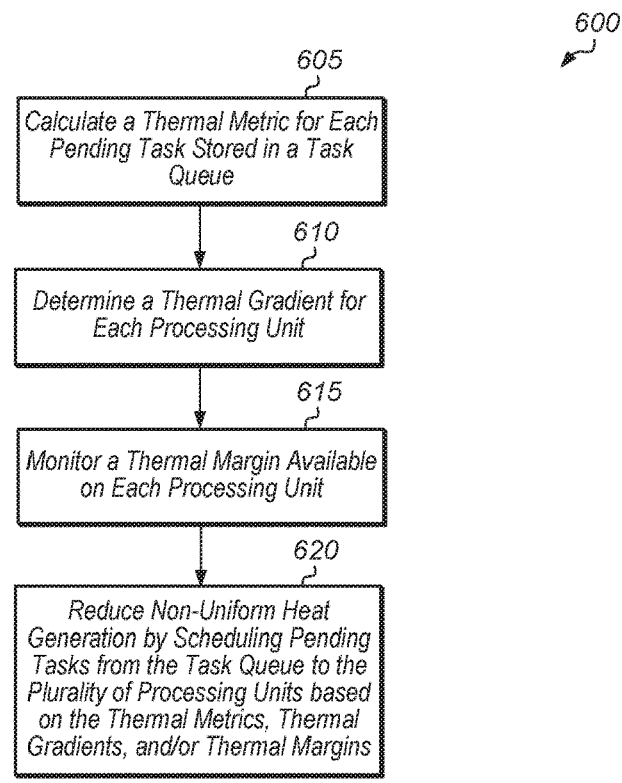
FIG. 6 is a generalized flow diagram illustrating another embodiment of a method for performing temperature-aware task scheduling and proactive power management.

Referring now to FIG. 6, another embodiment of a method 600 for performing temperature-aware task scheduling and proactive power management is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 600.

A system with a plurality of processing units and a task queue for storing a plurality of pending tasks calculates a thermal metric for each pending task stored in the task queue (block 605). In one embodiment, the system is a SoC. The thermal metric of a pending task indicates an amount of heat a pending task is predicted to generate when executed. In one embodiment, the thermal metric is calculated based on one or more of hints passed from the programmers, whether the pending task is compute-bound or memory-bound, a compiler's statistical analysis based on types of instructions, frequency of datapath vs. memory instructions, memory address access patterns, past thermal history of the same task IDs kept by the operating system (OS), etc. In some cases, a task has separate thermal metrics for different types of processing units. For example, a given task has a first thermal metric for a first type of processing unit, the given task has a second thermal metric for a second type of processing unit, and so on.

Next, the system determines a thermal gradient for each processing unit of the system (block 610). The thermal gradient of a processing unit indicates a rate at which a processing unit temperature will change when executing a task. In SoC's with multiple different types of processing units, the thermal gradients of processing units can vary from processing unit to processing unit. For example, a CPU has a first thermal gradient and a GPU has a second thermal gradient, with the second thermal gradient being different from the first thermal gradient. Other types of processing units (e.g., ASICs, FPGAs) have other thermal gradients different from the first and second thermal gradients.

The system also monitors a thermal margin available on each processing unit (block 615). The thermal margin indicates how much a temperature of the processing unit can increase without exceeding a thermal limit. In some cases, the thermal limit for each processing unit is equal to the thermal limit for the system. In other cases, each processing unit has a separate thermal limit, and the system has a global thermal limit which is compared to an average of the temperature sensors of the system. In one embodiment, the system includes a temperature sensor for each processing unit. The system compares the temperature sensor of each processing unit to the thermal limit for the processing unit to calculate the thermal margin for the processing unit. In another embodiment, the system includes temperature sensors in different regions of the system, and the system uses a temperature sensor for the region a processing unit is located in to determine the temperature for a given processing unit.

Then, the system minimizes non-uniform heat generation by scheduling pending tasks from the task queue to the plurality of processing units based on the thermal metrics for the pending tasks, the thermal gradients of the processing units, and the thermal margins available for the processing units (block 620). For example, in one embodiment, the system is configured to reorder and assign pending tasks from the task queue out of order to maximize performance while preventing non-uniform heat generation on the system. The scheduling also constitutes assigning pending tasks to processing units to prevent thermal limits on the processing units from being exceeded. The scheduling further constitutes adjusting power states to the plurality of processing units when scheduling pending tasks to the plurality of processing units to minimize non-uniform heat generation on the system while preventing the thermal limits of the processing units from being exceeded. In one embodiment, the scheduling includes generating a first product by multiplying a thermal metric of a first pending task by a thermal gradient of a first processing unit, comparing the first product to a thermal margin of the first processing unit, and allowing the first pending task to be scheduled to the first processing unit if the first product is less than or equal to the thermal margin of the first processing unit. In other embodiments, other techniques for scheduling pending tasks to the plurality of processing units are utilized. After block 620, method 600 ends.

Figure 7:
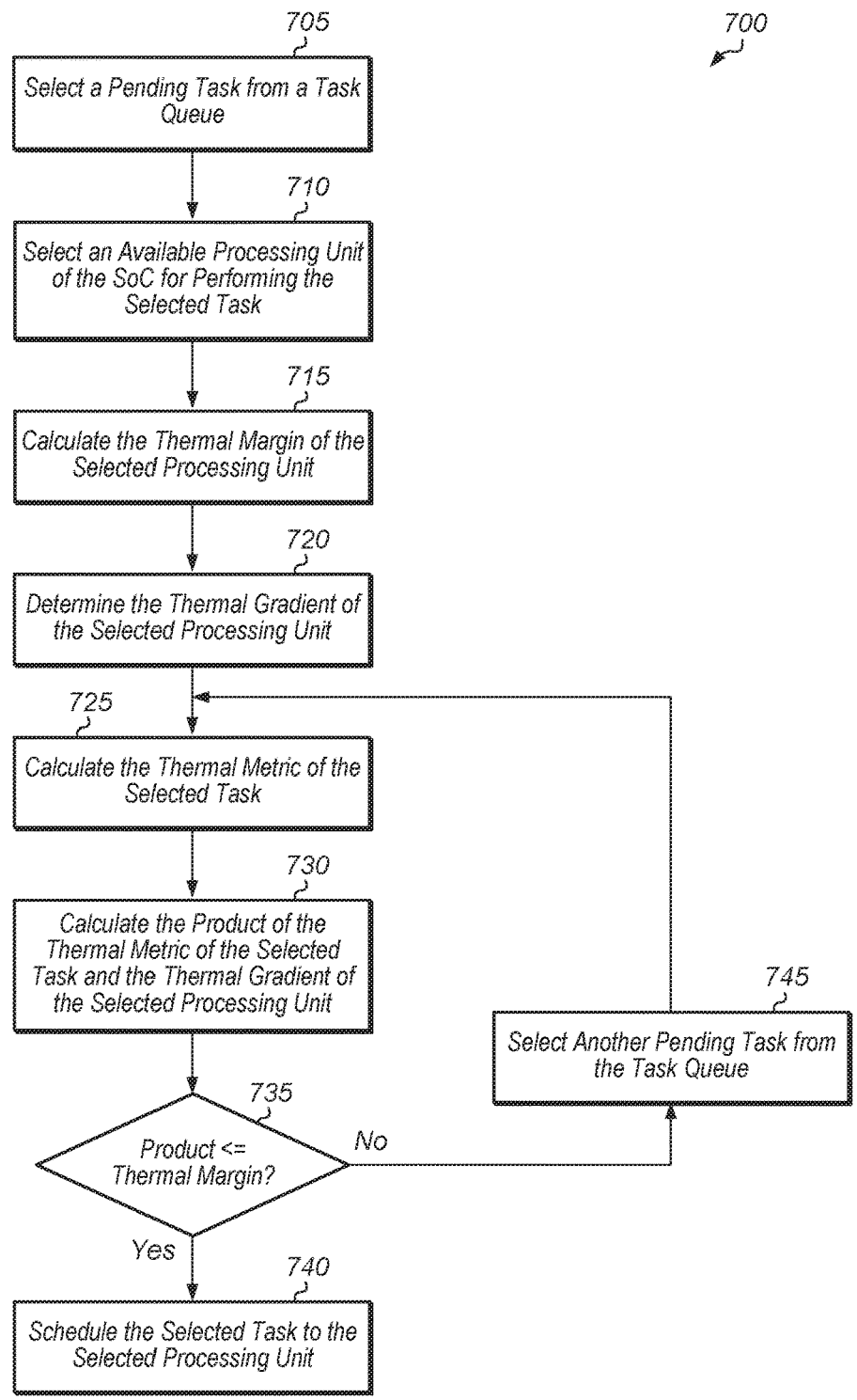
FIG. 7 is a generalized flow diagram illustrating another embodiment of a method for performing temperature-aware task scheduling and proactive power management.

Referring now to FIG. 7, another embodiment of a method 700 for performing temperature-aware task scheduling and proactive power management is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 700.

A scheduler of a SoC (e.g., SoC 105 of FIG. 1) selects a pending task from a task queue (block 705). The scheduler selects an available processing unit of the SoC for performing the selected task (block 710). Next, the scheduler calculates the thermal margin of the selected processing unit (block 715). Then, the scheduler determines the thermal gradient of the selected processing unit (block 720).

Additionally, the scheduler calculates the thermal metric of the selected task (block 725). Then, the scheduler calculates the product of the thermal metric of the selected task and the thermal gradient of the selected processing unit (block 730). In some cases, the scheduler multiplies the thermal metric and/or the thermal gradient by one or more weighting factors or additional metrics when calculating the product in block 730. If the product of the thermal metric of the task and the thermal gradient of the selected processing unit is less than or equal to the thermal margin of the identified processing unit (conditional block 735, "yes" leg), then the scheduler schedules the selected task to the selected processing unit (block 740). Otherwise, if the product of the thermal metric of the task and the thermal gradient of the identified processing unit is greater than the thermal margin of the identified processing unit (conditional block 735, "no" leg), then the scheduler selects another pending task from the task queue (block 745). After block 745, method 700 returns to block 725. After block 740, method 700 ends.

Figure 8:
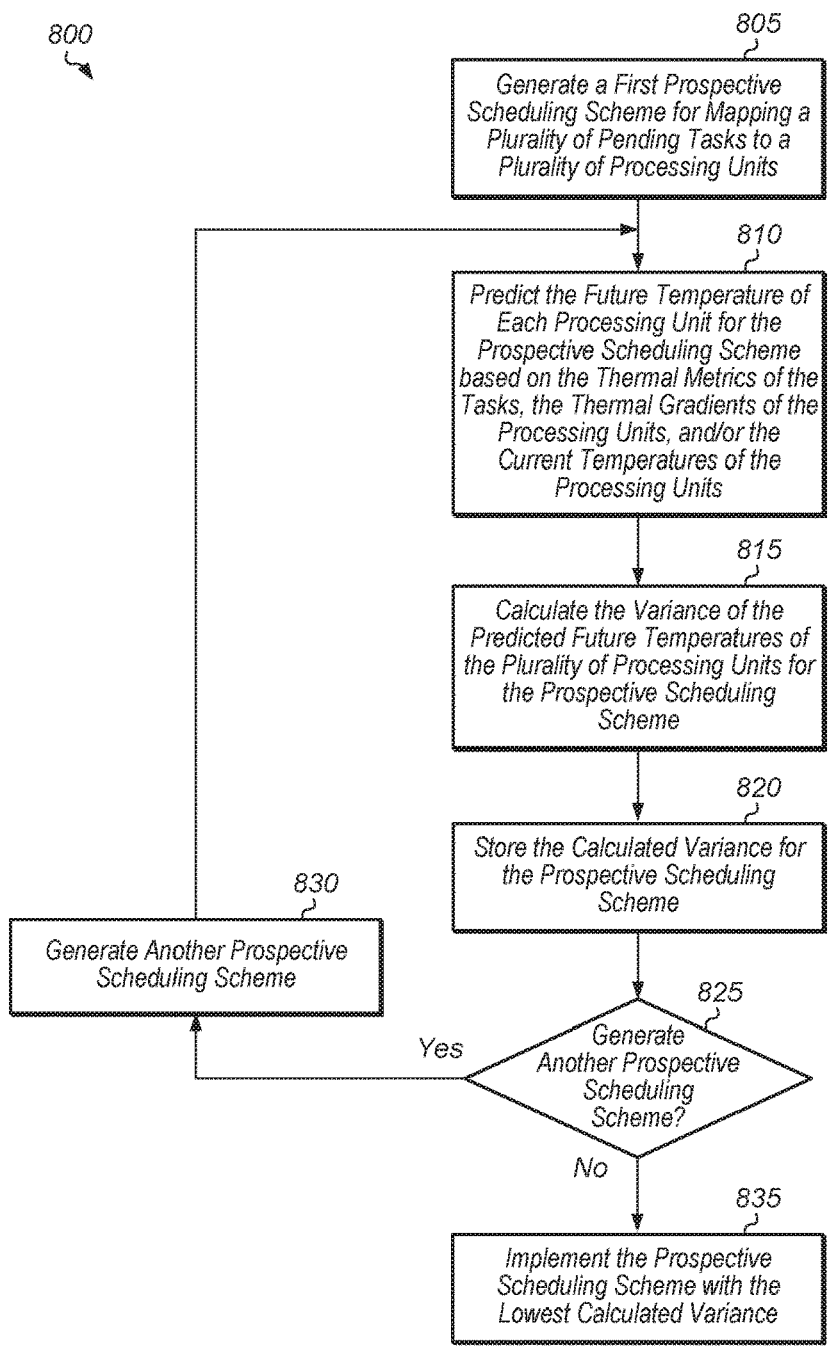
FIG. 8 is a generalized flow diagram illustrating another embodiment of a method for performing temperature-aware task scheduling and proactive power management.

Turning now to FIG. 8, another embodiment of a method 800 for performing temperature-aware task scheduling and proactive power management is shown. For purposes of discussion, the steps in this embodiment are shown in sequential order. It should be noted that in various embodiments of the method described below, one or more of the elements described are performed concurrently, in a different order than shown, or are omitted entirely. Other additional elements are also performed as desired. Any of the various systems or apparatuses described herein are configured to implement method 800.

A scheduler of a SoC generates a first prospective scheduling scheme for mapping a plurality of pending tasks to a plurality of processing units (block 805). The first prospective scheduling scheme includes both the scheduling of pending tasks to processing units and the assignment of power states for the plurality of processing units. The scheduler coordinates with a power manager to generate the first prospective scheduling scheme. In one embodiment, the scheduler treats the scheduling of tasks and assignment of power states as a constraint satisfaction problem (CSP), and the scheduler runs any of various algorithms for solving the CSP to find a power-state allocation that meets the various constraints imposed on the scheduling of tasks and assignment of power states. In one embodiment, a model predictive control (MPC) algorithm is utilized for looking into a receding window of a subset of scheduled tasks along with the temperature gradient model of the processing units to determine appropriate power states for the scheduled tasks without violating thermal limits.

Next, the scheduler predicts the future temperature of each processing unit for the prospective scheduling scheme based on the thermal metrics of the tasks, the thermal gradients of the processing units, and the current temperatures of the processing units (block 810). Then, the scheduler calculates the variance of the predicted future temperatures of the plurality of processing units for the prospective scheduling scheme (block 815). Next, the scheduler stores the calculated variance for the prospective scheduling scheme (block 820).

Then, the scheduler determines whether to generate another prospective scheduling scheme for mapping the plurality of pending tasks to the plurality of processing units (conditional block 825). If the scheduler determines to generate if another prospective scheduling scheme for mapping the plurality of pending tasks to the plurality of processing units (conditional block 825, "yes" leg), then the scheduler generates another prospective scheduling scheme (block 830), and then method 800 returns to block 810. If the scheduler determines not to generate another possible scheduling scheme (conditional block 825, "no" leg), then the scheduler implements the prospective scheduling scheme with the lowest calculated variance (block 835). After block 835, method 800 ends.

In various embodiments, program instructions of a software application are used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computing system during use to provide the program instructions and accompanying data to the computing system for program execution. The computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
 a plurality of processing units, wherein at least two of the processing units have different architectures; and
 a task queue for storing a plurality of pending tasks;
 wherein the system comprises circuitry configured to:
  calculate a thermal metric for each pending task of the plurality of pending tasks stored in the task queue, wherein calculating a thermal metric for a pending task comprises calculating at least two different thermal metrics for the pending task based on the two processing units that have different architectures;
  determine a thermal gradient for each processing unit of the plurality of processing units including at least two different thermal gradients for two processing units that have different architectures, wherein said thermal gradient indicates a rate at which a processing unit temperature will change when executing a task;
  monitor a thermal margin available on each processing unit, wherein said thermal margin indicates how much a temperature of a processing unit can increase without exceeding a thermal limit of the processing unit; and
  reduce non-uniform heat generation in the system by scheduling pending tasks from the task queue to the plurality of processing units based on the thermal metrics of the pending tasks, the thermal gradients of each processing unit, and the thermal margin available on each processing unit.

2. The system as recited in claim 1, wherein the system is configured to schedule pending tasks from the task queue to the plurality of processing units to prevent thermal limits of the processing units from being exceeded.

3. The system as recited in claim 1, wherein the system is configured to schedule a task to be executed on a first processing unit with a first architecture, responsive to determining executing the task on the first processing unit causes lower increase in temperature than executing on a second processing unit with a second architecture, wherein the task has a classification indicating execution on the second processing unit with the second architecture.

4. The system as recited in claim 2, wherein the system is configured to adjust power states to the plurality of processing units when scheduling pending tasks to the plurality of processing units to reduce non-uniform heat generation on the system while preventing the thermal limits of the processing units from being exceeded.

5. The system as recited in claim 1, wherein the system is configured to:
 generate a first product by multiplying a thermal metric of a first pending task by a thermal gradient of a first processing unit;
 compare the first product to a thermal margin of the first processing unit; and
 allow the first pending task to be scheduled to the first processing unit if the first product is less than or equal to the thermal margin of the first processing unit.

6. The system as recited in claim 1, wherein a thermal metric for a given task is calculated based at least in part on a programmer provided hint.

7. The system as recited in claim 1, wherein a thermal metric for a given task is calculated based on a historical data associated with previous executions of the given task.

8. A method comprising:
calculating a thermal metric for each pending task of a plurality of pending tasks stored in a task queue, wherein calculating a thermal metric for a pending task comprises calculating at least two different thermal metrics for the pending task based on two processing units that have different architectures;
determining a thermal gradient for each processing unit of a plurality of processing units including at least two different thermal gradients for two processing units that have different architectures, wherein said thermal gradient indicates a rate at which a processing unit temperature will change when executing a task;
monitoring a thermal margin available on each processing unit, wherein said thermal margin indicates how much a temperature of a processing unit can increase without exceeding a thermal limit of the processing unit; and
reducing non-uniform heat generation by scheduling pending tasks from the task queue to the plurality of processing units based on the thermal metrics of the pending tasks, the thermal gradients of each processing unit, and the thermal margin available on each processing unit.

9. The method as recited in claim 8, further comprising scheduling pending tasks from the task queue to the plurality of processing units to prevent thermal limits of the processing units from being exceeded.

10. The method as recited in claim 8, further comprising schedule a task to be executed on a first processing unit with a first architecture, responsive to determining executing the task on the first processing unit causes lower increase in temperature than executing on a second processing unit with a second architecture, wherein the task has a classification indicating execution on the second processing unit with the second architecture.

11. The method as recited in claim 9, further comprising adjusting power states to the plurality of processing units when scheduling pending tasks to the plurality of processing units to reduce non-uniform heat generation on the system while preventing the thermal limits of the processing units from being exceeded.

12. The method as recited in claim 8, further comprising:
generating a first product by multiplying a thermal metric of a first pending task by a thermal gradient of a first processing unit;
comparing the first product to a thermal margin of the first processing unit; and
allowing the first pending task to be scheduled to the first processing unit if the first product is less than or equal to the thermal margin of the first processing unit.

13. The method as recited in claim 8, wherein a thermal metric for a given task is calculated based on at least in part on a programmer provided hint.

14. The method as recited in claim 8, wherein a thermal metric for a given task is calculated based on a historical data associated with previous executions of the given task.

15. A non-transitory computer readable storage medium storing program instructions, wherein the program instructions are executable by a processor to:
calculate a thermal metric for each pending task of a plurality of pending tasks stored in a task queue, wherein calculating a thermal metric for a pending task comprises calculating at least two different thermal metrics for the pending task based on two processing units that have different architectures;
determine a thermal gradient for each processing unit of a plurality of processing units including at least two different thermal gradients for two processing units that have different architectures, wherein said thermal gradient indicates a rate at which a processing unit temperature will change when executing a task;
monitor a thermal margin available on each processing unit, wherein said thermal margin indicates how much a temperature of a processing unit can increase without exceeding a thermal limit of the processing unit; and
reduce non-uniform heat generation by scheduling pending tasks from the task queue to the plurality of processing units based on the thermal metrics of the pending tasks, the thermal gradients of each processing unit, and the thermal margin available on each processing unit.

16. The non-transitory computer readable storage medium as recited in claim 15, wherein the program instructions are further executable by a processor to schedule pending tasks from the task queue to the plurality of processing units to prevent thermal limits of the processing units from being exceeded.

17. The non-transitory computer readable storage medium as recited in claim 15, wherein the program instructions are further executable by a processor to schedule a task to be executed on a first processing unit with a first architecture, responsive to determining executing the task on the first processing unit causes lower increase in temperature than executing on a second processing unit with a second architecture, wherein the task has a classification indicating execution on the second processing unit with the second architecture.

18. The non-transitory computer readable storage medium as recited in claim 16, wherein the program instructions are further executable by a processor to adjust power states to the plurality of processing units when scheduling pending tasks to the plurality of processing units to reduce non-uniform heat generation on the system while preventing the thermal limits of the processing units from being exceeded.

19. The non-transitory computer readable storage medium as recited in claim 15, wherein the program instructions are further executable by a processor to:
generate a first product by multiplying a thermal metric of a first pending task by a thermal gradient of a first processing unit;
compare the first product to a thermal margin of the first processing unit; and
allow the first pending task to be scheduled to the first processing unit if the first product is less than or equal to the thermal margin of the first processing unit.

20. The non-transitory computer readable storage medium as recited in claim 15, wherein a thermal metric for a given task is calculated based at least in part on a programmer provided hint.

* * * * *